(12) United States Patent
Sun et al.

(10) Patent No.: US 11,740,955 B2
(45) Date of Patent: Aug. 29, 2023

(54) METHOD, ELECTRONIC DEVICE, AND COMPUTER PROGRAM PRODUCT FOR EXTRACTING FAULT INFORMATION FROM LOG FILES

(71) Applicant: EMC IP Holding Company LLC, Hopkinton, MA (US)

(72) Inventors: Adona Li Sun, Chengdu (CN); Qingxiao Zheng, Chengdu (CN); Bing Bai, Chengdu (CN); Sager Liao, Chengdu (CN); Beryl Wang, Chengdu (CN); Jing Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/872,012

(22) Filed: May 11, 2020

(65) Prior Publication Data
US 2021/0303380 A1   Sep. 30, 2021

(30) Foreign Application Priority Data
Mar. 24, 2020   (CN) .......................... 202010214680.2

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0751* (2013.01); *G06F 11/0778* (2013.01);
(Continued)

(58) Field of Classification Search
CPC ............. G06F 11/0766; G06F 11/0778; G06F 11/0781; G06F 11/079; G06F 16/245; G06F 40/279; G06F 40/30
See application file for complete search history.

(56) References Cited

U.S. PATENT DOCUMENTS

| | | | |
|---|---|---|---|
| 6,609,217 B1 * | 8/2003 | Bonissone | G16H 30/20 714/26 |
| 7,313,728 B2 * | 12/2007 | Rhea | G06F 11/0727 714/25 |

(Continued)

*Primary Examiner* — Elmira Mehrmanesh
(74) *Attorney, Agent, or Firm* — Womble Bond Dickinson (US) LLP (57) ABSTRACT

Embodiments of the present disclosure relate to a method for providing log information, an electronic device, and a computer program product. A method for providing log information includes: determining a first set of semantic segments including fault information from multiple semantic segments into which a set of log files of a target system is divided; extracting key information specific to the target system from the first set of semantic segments; determining, based on the extracted key information, an application scenario involved in the fault information and at least one log file related to the application scenario in the set of log files; determining a second set of semantic segments including the key information from multiple semantic segments into which the at least one log file is divided; and providing the first set of semantic segments and the second set of semantic segments by highlighting the fault information and the key information in the first set of semantic segments and the second set of semantic segments. The embodiments of the present disclosure contribute to improving the efficiency of a user in locating the cause of a system fault, thereby improving user satisfaction.

20 Claims, 5 Drawing Sheets

(51) Int. Cl.
  *G06F 40/279* (2020.01)
  *G06F 16/245* (2019.01)
  *G06F 40/30* (2020.01)

(52) U.S. Cl.
  CPC .......... *G06F 16/245* (2019.01); *G06F 40/279* (2020.01); *G06F 40/30* (2020.01)

(56) References Cited

U.S. PATENT DOCUMENTS

| | | | | |
|---|---|---|---|---|
| 8,131,539 | B2* | 3/2012 | Liu | G06F 40/53 704/9 |
| 8,266,159 | B2* | 9/2012 | Torres | G06F 11/3664 707/752 |
| 9,703,536 | B2* | 7/2017 | Dettman | G06N 5/003 |
| 9,785,893 | B2* | 10/2017 | Riksheim | G06Q 10/06 |
| 9,824,148 | B2* | 11/2017 | Zhang | G06F 16/334 |
| 10,783,053 | B1* | 9/2020 | DeMeuse | G06F 11/0769 |
| 10,963,330 | B2* | 3/2021 | Ungar | G06F 11/0778 |
| 2009/0193397 | A1* | 7/2009 | Chithambaram | G06F 8/35 717/128 |
| 2010/0070469 | A1* | 3/2010 | Bomma | G06F 16/10 707/610 |
| 2011/0153616 | A1* | 6/2011 | Torres | G06F 11/3664 707/741 |
| 2011/0295775 | A1* | 12/2011 | Wang | G06F 16/48 706/12 |
| 2014/0250333 | A1* | 9/2014 | Duggan | H04L 41/069 714/37 |
| 2016/0124793 | A1* | 5/2016 | Ruan | G06F 11/079 714/37 |
| 2017/0154046 | A1* | 6/2017 | Chen | G06F 16/2228 |
| 2017/0331796 | A1* | 11/2017 | Crofton | G06F 16/1724 |
| 2018/0004824 | A1* | 1/2018 | Russell | G06N 20/00 |
| 2018/0173751 | A1* | 6/2018 | Gatto | G06F 11/3476 |
| 2019/0235941 | A1* | 8/2019 | Bath | G06F 11/079 |
| 2019/0243827 | A1* | 8/2019 | Ferrar | G06F 11/0766 |
| 2019/0303509 | A1* | 10/2019 | Greene | G06F 16/9024 |

\* cited by examiner

METHOD, ELECTRONIC DEVICE, AND COMPUTER PROGRAM PRODUCT FOR EXTRACTING FAULT INFORMATION FROM LOG FILES

CROSS-REFERENCE TO RELATED APPLICATION

This patent application claims priority, under 35 U.S.C. § 119, of Chinese Patent Application No. 202010214680.2, filed Mar. 24, 2020, which is incorporated by reference in its entirety.

TECHNICAL FIELD

Embodiments of the present disclosure generally relate to the field of computers, and more particularly, to a method for providing log information, an electronic device, and a computer program product.

BACKGROUND

When a computer system (for example, a data backup system) is faulty, users (for example, system administrators or technical support staff) usually need to collect relevant log files in different folders, and then analyze the log files to locate the cause of the fault. However, log files may be massive. In addition, some log files may be quickly overwritten. This results in inefficiency in locating the cause of the fault by analyzing the log files.

SUMMARY OF THE INVENTION

Embodiments of the present disclosure provide a method for providing log information, an electronic device, and a computer program product.

In a first aspect of the present disclosure, a method for providing log information is provided. The method includes: determining a first set of semantic segments including fault information from multiple semantic segments into which a set of log files of a target system is divided; extracting key information specific to the target system from the first set of semantic segments; determining, based on the extracted key information, an application scenario involved in the fault information and at least one log file related to the application scenario in the set of log files; determining a second set of semantic segments including the key information from multiple semantic segments into which the at least one log file is divided; and providing the first set of semantic segments and the second set of semantic segments by highlighting the fault information and the key information in the first set of semantic segments and the second set of semantic segments.

In a second aspect of the present disclosure, an electronic device is provided. The device includes a processor and a memory. The memory is coupled to the processor and stores instructions for execution by the processor. The instructions, when executed by the processor, cause the device to perform actions. The actions include: determining a first set of semantic segments including fault information from multiple semantic segments into which a set of log files of a target system is divided; extracting key information specific to the target system from the first set of semantic segments; determining, based on the extracted key information, an application scenario involved in the fault information and at least one log file related to the application scenario in the set of log files; determining a second set of semantic segments including the key information from multiple semantic segments into which the at least one log file is divided; and providing the first set of semantic segments and the second set of semantic segments by highlighting the fault information and the key information in the first set of semantic segments and the second set of semantic segments.

In a third aspect of the present disclosure, a computer program product is provided. The computer program product is tangibly stored on a non-transitory computer storage medium and includes machine-executable instructions. When executed by a device, the machine-executable instructions cause the device to perform the method described according to the above first aspect.

In a fourth aspect of the present disclosure, a computer-readable storage medium is provided. A computer program is stored thereon. When executed by a processor, the program implements the method described according to the above first aspect.

The Summary section is provided to introduce the selection of concepts in a simplified form, which will be further described in the detailed description below. The Summary section is neither intended to identify key features or essential features of the present disclosure, nor intended to limit the scope of the present disclosure.

BRIEF DESCRIPTION OF THE DRAWINGS

The above and other objectives, features and advantages of the present disclosure will become more apparent by describing example embodiments of the present disclosure in detail with reference to the accompanying drawings, and in the example embodiments of the present disclosure, the same reference numerals generally represent the same components.

In each figure, the same or corresponding reference numerals represent the same or corresponding parts.

DETAILED DESCRIPTION

Preferred embodiments of the present disclosure will be described in more detail below with reference to the accompanying drawings. Although preferred embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete, and will fully convey the scope of the present disclosure to those skilled in the art.

The term "include" and its variants as used herein are open-ended, i.e., "including but not limited to." Unless specifically stated, the term "or" means "and/or." The term "based on" means "based at least in part on." The terms "one example embodiment" and "one embodiment" mean "at least one example embodiment." The term "another embodiment" means "at least one additional embodiment." The terms "first," "second," etc. may refer to different or identical objects. Other explicit and implicit definitions may be included below.

As described above, when a computer system (for example, a data backup system) is faulty, users (for example, system administrators or technical support staff) usually need to collect relevant log files in different folders, and then analyze the log files to locate the cause of the fault. However, log files may be massive. In addition, some log files may be quickly overwritten. This results in inefficiency in locating the cause of the fault by analyzing the log files.

The embodiments of the present disclosure provide a scheme for providing log information, to solve the above problems and/or other potential problems. According to the scheme, a first set of semantic segments including fault information is determined from multiple semantic segments into which a set of log files of a target system is divided. Key information specific to the target system is extracted from the first set of semantic segments. An application scenario involved in the fault information and at least one log file related to the application scenario in the set of log files are determined based on the extracted key information. A second set of semantic segments including the key information is determined from multiple semantic segments into which the at least one log file is divided. The first set of semantic segments and the second set of semantic segments are provided by highlighting the fault information and the key information in the first set of semantic segments and the second set of semantic segments. In this way, the embodiments of the present disclosure contribute to improving the efficiency of a user in locating the cause of a system fault, thereby improving user satisfaction.

Figure 1:
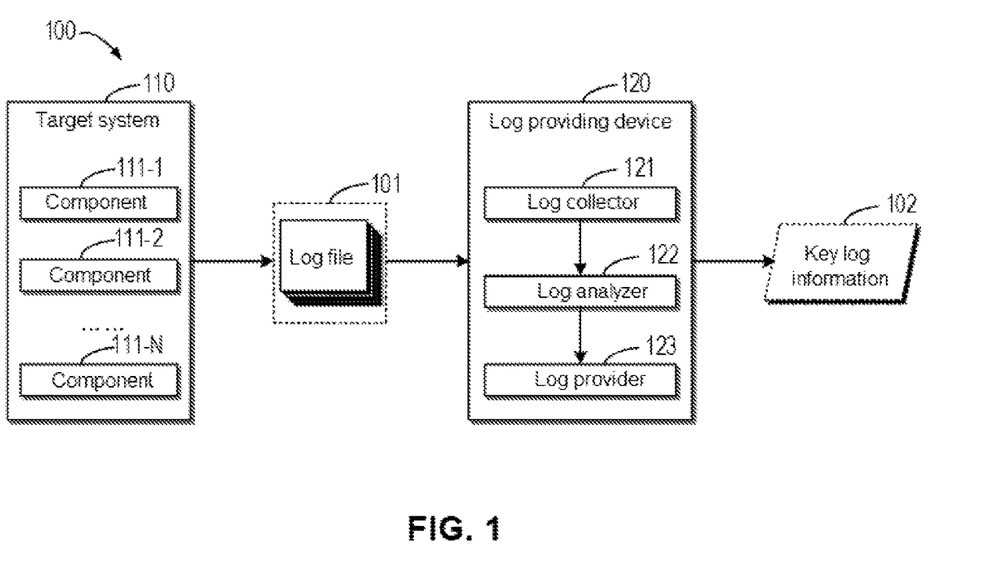
FIG. 1 illustrates a block diagram of an example environment in which embodiments of the present disclosure can be implemented.

Hereinafter, the embodiments of the present disclosure will be described in detail with reference to the accompanying drawings. FIG. 1 illustrates a block diagram of example environment 100 in which embodiments of the present disclosure can be implemented. It should be understood that the structure of example environment 100 is described for example purposes only. The type and quantity of entities included in example environment 100 are also shown for example purposes only, without implying any limitation on the scope of the present disclosure. The embodiments of the present disclosure may be implemented in an environment different from environment 100.

As shown in FIG. 1, environment 100 may include target system 110 and log providing device 120. Examples of target system 110 may include, but are not limited to, a computing system, a data storage system, a data backup system, and the like. Target system 110 may include multiple components 111-1, 111-2, . . . , 111-N (collectively referred to as "component 111," where N is a natural number). Component 111 may be a physical component or a logical component. Examples of component 111 may include, but are not limited to, a client, a server, a storage apparatus, a software module, and the like. For example, multiple components 111 may be implemented on different physical devices, respectively, or at least some components may be implemented on the same physical device. In some embodiments, corresponding log locations for multiple components 111 may be predefined, for example, as shown in Table 1, so that multiple components 111 record logs into a log file at the corresponding log locations when running.

TABLE 1

Predefined Log Location List

| Component | Log Location |
|---|---|
| Component 111-1 | C:\Program Files\avs\var\clientlogs |
| Component 111-2 | /usr/local/avamar/var/mc/server_log/mcserver.* |
| . . . | |
| Component 111-N | /data01/cur/gsan.log |

As shown in FIG. 1, log providing device 120 may include log collector 121, log analyzer 122, and log provider 123. Log collector 121 may acquire, from corresponding log locations predefined for multiple components 111, multiple log files 101 periodically or in response to a user command. In some embodiments, log collector 121 may filter multiple collected log files 101 to obtain a set of log files to be analyzed. For example, log collector 121 may filter multiple log files 101 according to time to obtain a set of log files that have been modified recently (for example, in the last 12 hours). Alternatively, in other embodiments, the above filtering operation may be omitted. Log collector 121 may provide the set of collected or filtered log files to log analyzer 122 for analysis.

Log analyzer 122 may analyze a set of log files from log collector 121 to mine important information therein, and intercept important segments from a long log file. In some embodiments, in order to facilitate the analysis of the log files, log analyzer 122 may divide each log file in the set of received log files into multiple semantic segments (also called "logical segment" or "log segment"). The "semantic segment" described herein refers to a text unit having the same subject or similar semantics, which may include one or more paragraphs, or at least a part of a certain paragraph. In some embodiments, log analyzer 122 may utilize any known text segmentation algorithm or any text segmentation algorithm to be developed in the future to divide the log file into multiple semantic segments. Examples of text segmentation algorithms include, but are not limited to, a Dotplotting algorithm, a text segmentation algorithm improved based on the Dotplotting algorithm, and/or any other suitable text segmentation algorithms.

Log analyzer 122 may analyze multiple semantic segments into which a set of log files is divided, so as to mine key log information 102 therein. Key log information 102 may include, for example, semantic segments with fault information and/or important system information, fault profiles, additional information, and/or suggestions, and so on. Log analyzer 122 may provide the obtained key log information 102 to log provider 123 and further to a user. Additionally or alternatively, in some embodiments, log provider 123 may also provide all log files to the user for reference by the user.

Figure 2:
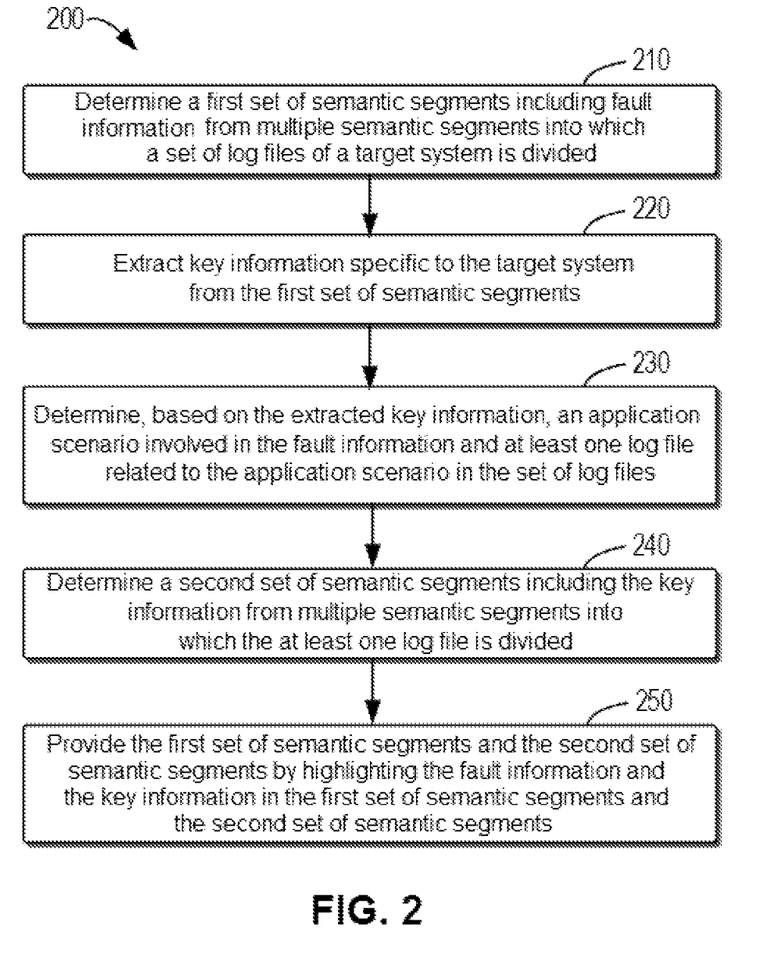
FIG. 2 illustrates a flowchart of an example method for providing log information according to embodiments of the present disclosure.

FIG. 2 illustrates a flowchart of example method 200 for providing log information according to embodiments of the present disclosure. For example, method 200 may be performed at log providing device 120 as shown in FIG. 1. It should be understood that method 200 may further include additional blocks not shown and/or omit the blocks shown, and the scope of the present disclosure is not limited in this regard. Method 200 is described in detail below with reference to FIG. 1.

As shown in FIG. 2, at block 210, log providing device 120 (for example, log analyzer 122) determines a first set of semantic segments including fault information from multiple semantic segments into which a set of log files of target system 110 is divided.

In some embodiments, as described above, log analyzer 122 may utilize any known text segmentation algorithm or any text segmentation algorithm to be developed in the future to divide a set of log files of target system 110 into multiple semantic segments. Examples of text segmentation algorithms include, but are not limited to, a Dotplotting algorithm, a text segmentation algorithm improved based on the Dotplotting algorithm, and/or any other suitable text segmentation algorithms. For the purpose of example, the text segmentation algorithm improved based on the Dotplotting algorithm according to an embodiment of the present disclosure is shown below. For example, the text segmentation algorithm may be as shown in Table 2:

TABLE 2

Example Text Segmentation Algorithm

Given text S, N is an optimal number of segments;
Initialize: B={ }, P={ }, Jmin=+∞,
    C={i|i is a candidate segment boundary in S}, Gbest=0;
Increase the number of segments from 1 to N
    For each element i in C
        1) P=B∪ {i};
        2) Calculate a score of a segmentation mode P using an evaluation function J;
        3) If Jmin>J, Jmin=J and Gbest=i;
    B=B∪ {Gbest};
    C=C − {Gbest};
End and output a segmentation result B In the algorithm shown in Table 2, segment boundaries are added successively until an optimal number of segments is reached. Paragraph boundaries may serve as candidate segment boundaries. To determine a new segment boundary, each candidate location may be checked. Assuming that a certain candidate location is added to a boundary set B and constitutes a current segment set P, the boundary in P may be used to calculate a value of the segmentation evaluation function J. The boundary location that reaches a minimum value is selected as the next boundary to be inserted into the boundary set B until the number of boundaries is equal to N. In some embodiments, evaluation function J in the above algorithm is expressed as follows:

$$J = \sum_{j=2}^{|P|} \frac{V_{P_{j-1},P_j} \times V_{P_j,n}}{(P_j - P_{j-1})(n - P_j)} + \sum_{j=1}^{|P-1|} \frac{V_{0,P} \times V_{P_j,P_{j+1}}}{P_j(P_{j+1} - P_j)}$$

where n is the length of an entire text, $P_1$ is the location of a jth semantic segment boundary. |P| is the number of semantic segments in the text. $V_{x,y}$ is a word frequency vector of a text segment composed of an xth word to a yth word. As the similarity of two segments is lower, a theme will more probably change at the end of a paragraph between the two segments. In this way, it is possible to find a text segmentation mode with the smallest similarity between adjacent segments. It should be understood that the above text segmentation algorithm is shown for example purposes only, and is not intended to limit the scope of the present disclosure. The embodiments of the present disclosure are also applicable to other text segmentation algorithms.

Log analyzer 122 may perform a fault information search on multiple semantic segments into which a set of log files is divided. In some embodiments, before performing a fault information search on multiple semantic segments into which a set of log files is divided, log analyzer 122 may pre-process the multiple semantic segments, including but not limited to removing timestamps, unifying case, symbolizing character streams, and so on. In some embodiments, log analyzer 122 may search the multiple pre-processed semantic segments for fault keywords, such as error, warning, failure, and crash, and determine a first set of semantic segments based on a search result such that each semantic segment in the first set of semantic segments includes the at least one of the above fault keywords. Additionally or alternatively, in some embodiments, log analyzer 122 may search the multiple semantic segments for a fault code based on a regular expression representing a fault code. Log analyzer 122 may determine the first set of semantic segments including fault information according to the context of the found fault code.

At block 220, log providing device 120 (for example, log analyzer 122) extracts key information specific to target system 110 from the first set of semantic segments. In some embodiments, the extracted key information may be information shared among multiple components 111, such as component names or identifiers, component software versions, component operating system types, session identifiers, and storage apparatus names. It should be understood that the extracted key information may be different in different implementations.

In some embodiments, log analyzer 122 may extract the key information specific to target system 110 by searching the first set of semantic segments for at least one keyword indicating a type of the key information. Examples of keywords indicating key information types may include, but are not limited to, keywords indicating component identifiers (such as client identifiers cid), keywords indicating identifiers of plug-ins in components (such as plug-in identifiers pid in a client), keywords indicating the number of plug-ins in components (such as the number of plug-ins pidnum in the client), keywords related to service operation types such as backup, replication, or restore, and the like. It should be understood that in a specific implementation, the keywords searched for may be determined according to specific requirements, and are not limited to those listed above.

At block 230, log providing device 120 (for example, log analyzer 122) determines, based on the extracted key information, an application scenario involved in the fault information and at least one log file related to the application scenario in the set of log files.

In some embodiments, as described above, log analyzer 122 may search the first set of semantic segments for keywords related to a service operation type, such as backup, replication, or restore, thereby determining a service operation type related to the application scenario. Then, log analyzer 122 may identify the application scenario based on the service operation type and the key information.

In some embodiments, target system 110 may predefine one or more application scenarios. For example, for each predefined application scenario, a service operation type involved in the predefined application scenario and at least one component 111 associated with the predefined application scenario may be specified. Taking a data backup system as an example, examples of service operation types include, but are not limited to, full backup to a certain storage apparatus, incremental backup to a certain storage apparatus, restoration of backup data to its original location, restoration of backup data to different locations, replication with incremental backup, and the like. Log analyzer 122 may match a service operation type determined in the first set of semantic segments with a service operation type in the predefined application scenario, thereby determining in which one of one or more predefined application scenarios is involved in the fault information. Log analyzer 122 may determine, based on at least one component 111 associated with the predefined application scenario and Table 1, log locations in which log files will be involved in the predefined application scenario. In this way, log analyzer 122 can determine at least one log file related to the application scenario in the set of log files.

In some embodiments, log analyzer 122 may generate a fault profile related to the application scenario based on a fault code extracted from the first set of semantic segments, the determined service operation type, and system key information. Examples of fault profiles are shown in Table 3, which may be used as part of key log information 102 later.

TABLE 3

| Example Fault Profile | |
|---|---|
| Client Name | vm-a4dpn227d4-1.asl.lab.emc.com |
| Service Operation Type | restore only |
| Client Identifier | 78385d4cddd7cf0764077f8cfba96b80d79bce46 |
| Client Operating System | N/A |
| Storage Location | N/A |
| Client Plug-in Identifier | oracle_server |
| Client Software Version | 19.1.100-38 |
| Fault Code | Cannot use command when connected to a mounted target database |

At block 240, log providing device 120 or example, log analyzer 122 determines a second set of semantic segments including system key information from multiple semantic segments into which at least one log file (related to the determined application scenario) is divided. As described above, log analyzer 122 may determine at least one log file related to the application scenario in the set of log files. In some embodiments, log analyzer 122 may search multiple semantic segments into which the at least one log file is divided for those key information extracted from the first set of semantic segments.

At block 250, log providing device 120 (for example, log provider 123) provides the first set of semantic segments and the second set of semantic segments by highlighting the fault information and the key information in the first set of semantic segments and the second set of semantic segments.

Figure 3A:
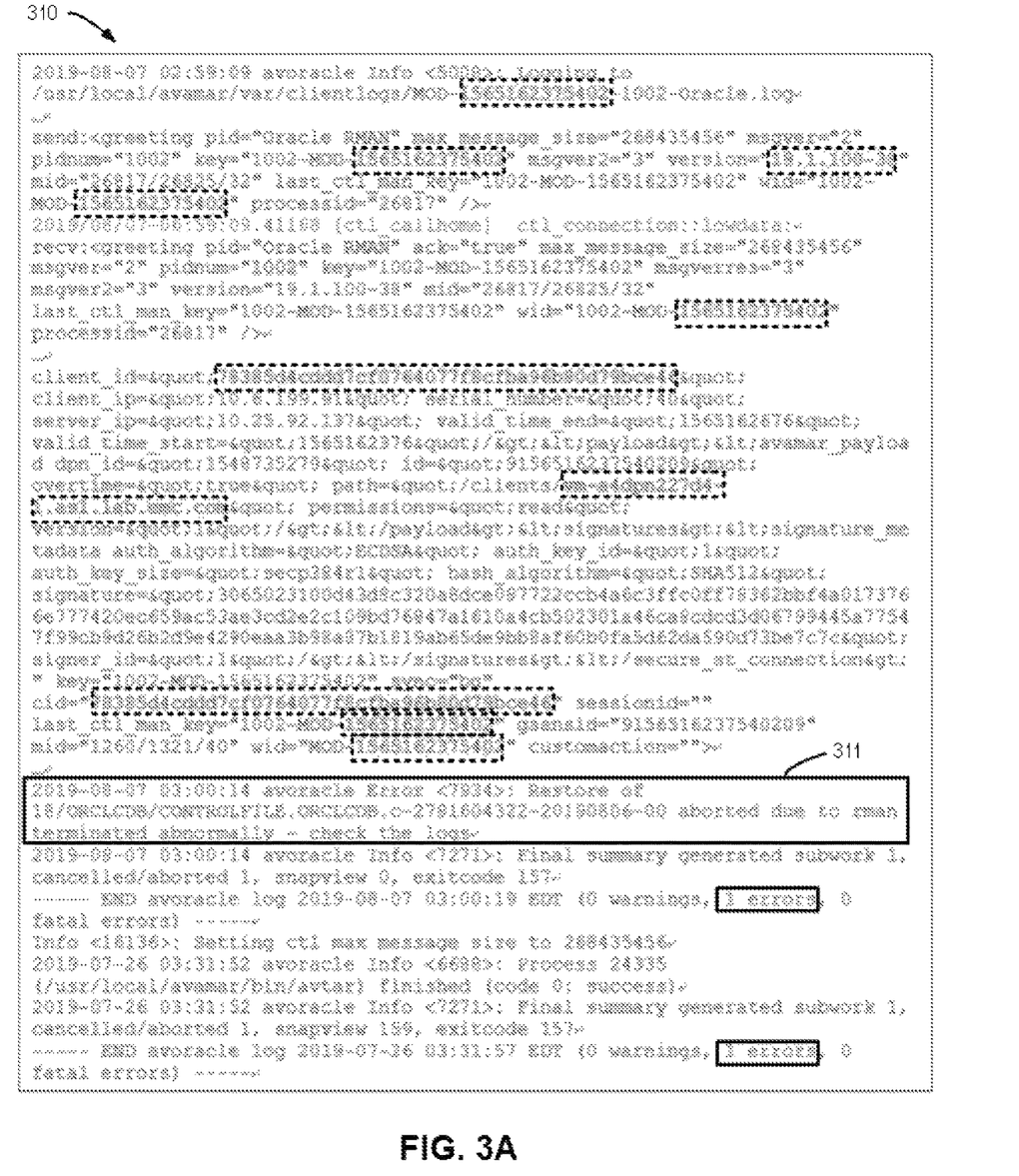
FIGS. 3A and 3B respectively illustrate log segments including highlighted fault information and system key information according to embodiments of the present disclosure.
Figure 3B:
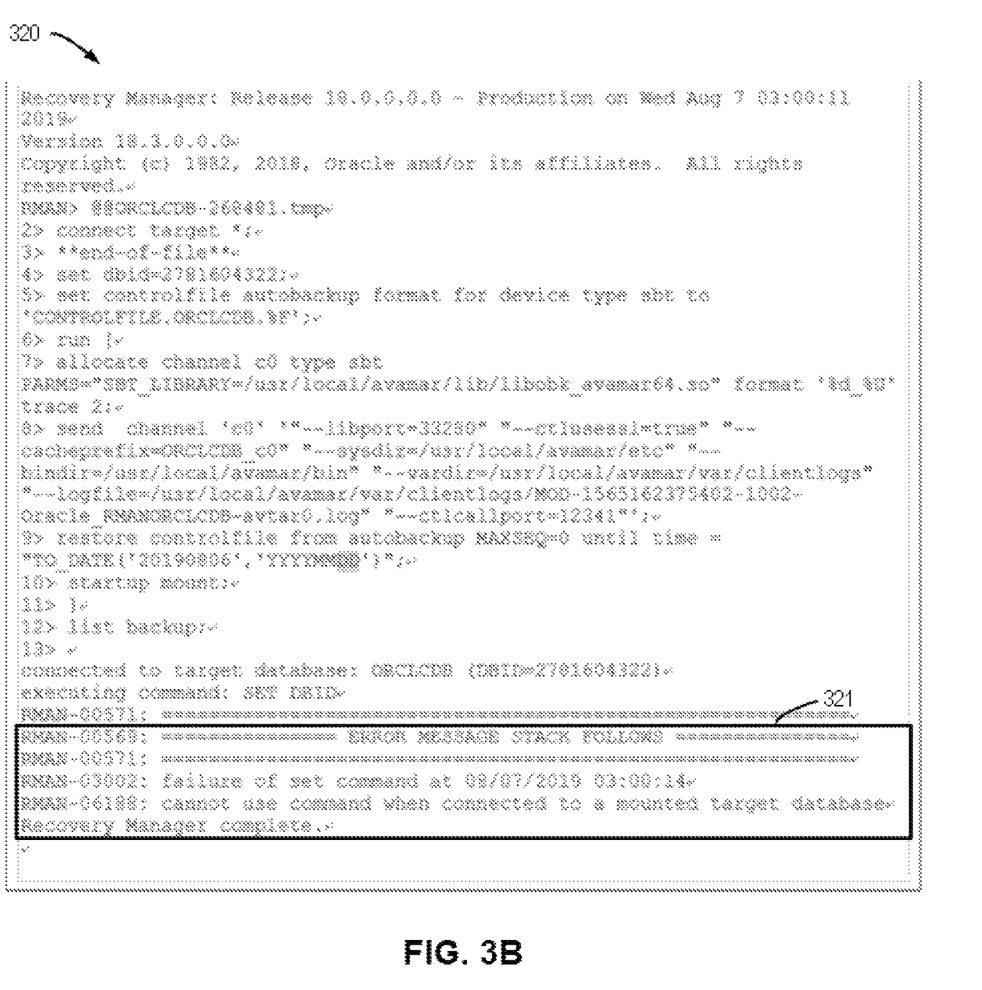

FIGS. 3A and 3B respectively illustrate semantic segments 310 and 320 including highlighted fault information and system key information according to embodiments of the present disclosure. In FIGS. 3A and 3B, highlighted system key information is shown by a dashed box, and highlighted fault information is shown by a solid box. From fault information 311 shown in FIG. 3A, it is possible to determine that an Avoracle component has an error due to the abnormal termination of an Rman component. Then, from fault information 321 shown in FIG. 3B, it is possible to determine the root cause of the fault, "a command cannot be used when connecting to an installed target database." In this way, users can determine root causes of system faults from a small amount of key log information without having to mine information from massive log files.

Additionally or alternatively, in some embodiments, log provider 123 may provide the fault profile shown in Table 3 while providing the first set of semantic segments and the second set of semantic segments.

Additionally or alternatively, in some embodiments, log providing device 120 may further collect information related to a fault code and generate suggestions to resolve the fault as part of key log information 102 shown in FIG. 1 for users. For example, if the fault code is "insufficient memory," log providing device 120 may acquire memory usage information of target system 110 and append it to key log information 102. If the fault code is "stack overflow," log providing device 120 may acquire a kernel dump file and append it to key log information 102. If the fault code is "backup task timeout," log providing device 120 may acquire information such as the resource usage of target system 110 or an execution time of other tasks, and append it to key log information 102.

Additionally or alternatively, in some embodiments, log providing device 120 may package all the obtained log files and the extracted various types of information, and provide it together with key log information 102 shown in FIG. 2 to users for reference.

As can be seen from the above description, the embodiments of the present disclosure provide a scheme for providing log information. This scheme can collect corresponding log files and automatically retrieve the fault information context and the service operation context of related components. Based on predefined application scenarios, the log analyzer not only can intelligently detect log segments containing fault information, but also can locate internal relationships between fault-related components from logs of different components. In this way, the embodiments of the present disclosure contribute to improving the efficiency of a user in locating the cause of a system fault, thereby improving user satisfaction.

Figure 4:
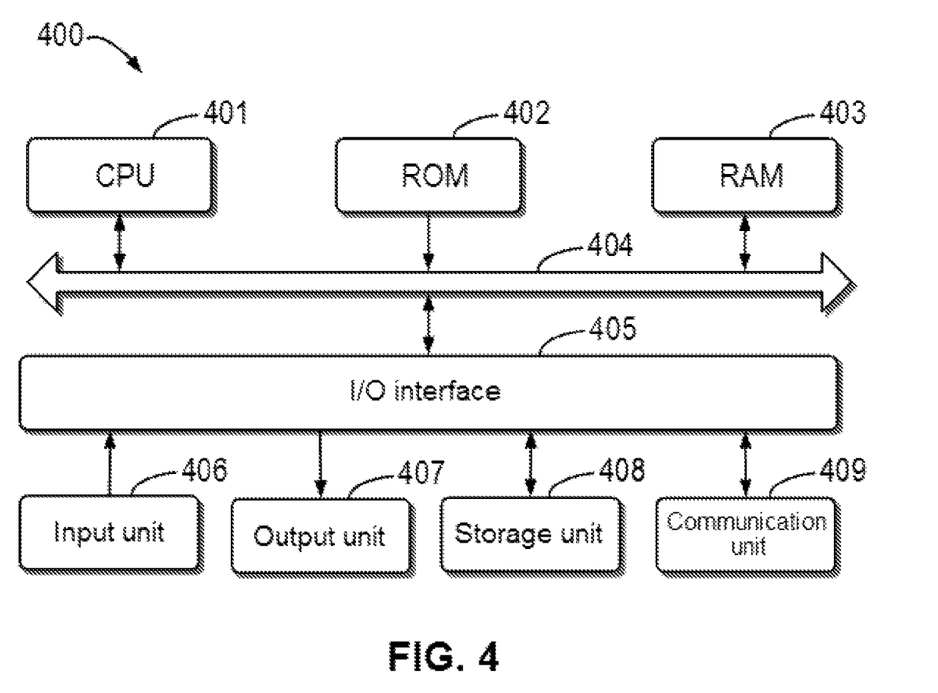
FIG. 4 illustrates a schematic block diagram of an example electronic device that may be used to implement embodiments of the present disclosure.

FIG. 4 illustrates a schematic block diagram of example electronic device 400 that may be used to implement embodiments of the present disclosure. For example, log providing device 120 shown in FIG. 1 may be implemented by device 400. As shown in FIG. 4, device 400 includes central processing unit (CPU) 401 that may perform various appropriate actions and processes according to computer program instructions stored in read only memory (ROM) 402 or computer program instructions loaded from storage unit 408 to random access memory (RAM) 403. In RAM 403, various programs and data required for the operation of device 400 may also be stored. CPU 401, ROM 402 and RAM 403 are connected to each other through bus 404. Input/output (I/O) interface 405 is also connected to bus 404.

Multiple components in device 400 are connected to I/O interface 405, including: input unit 406, such as a keyboard or a mouse; output unit 407, such as various types of displays or speakers; storage unit 408, such as a magnetic disk or an optical disk; and communication unit 409, such as a network card, a modem, or a wireless communication transceiver. Communication unit 409 allows device 400 to exchange information/data with other devices over a computer network such as the Internet and/or various telecommunication networks.

The various processes and processing described above, such as method 200, may be performed by processing unit 401. For example, in some embodiments, method 200 may be implemented as a computer software program that is tangibly included in a machine-readable medium, such as storage unit 408. In some embodiments, some or all of the computer programs may be loaded and/or installed onto device 400 via ROM 402 and/or communication unit 409. One or more actions of method 200 described above may be performed when the computer program is loaded into RAM 403 and executed by CPU 401.

The present disclosure may be a method, a device, a system, and/or a computer program product. The computer program product may include a computer-readable storage medium having computer-readable program instructions for performing various aspects of the present disclosure loaded thereon.

The computer-readable storage medium may be a tangible device that may retain and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, an RAM, an ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions recorded thereon, and any suitable combination of the foregoing. The computer-readable storage medium as used herein is not to be interpreted as transient signals per se, such as radio waves or other freely propagated electromagnetic waves, electromagnetic waves propagated through waveguides or other transmission media (e.g., light pulses through fiber optic cables), or electrical signals transmitted through electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmissions, wireless transmissions, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages such as Smalltalk, C++, etc., as well as conventional procedural programming languages such as a "C" language or similar programming languages. The computer readable program instructions can be completely executed on a user computer, partially executed on a user computer, executed as a separate software package, partially executed on a user computer and partially executed on a remote computer, or completely executed on a remote computer or a server. In the case where a remote computer is involved, the remote computer may be connected to a user computer through any type of networks, including an LAN or a WAN, or may be connected to an external computer (e.g., connected through the Internet using an Internet service provider). In some embodiments, an electronic circuit, such as a programmable logic circuit, a field programmable gate array (FPGA), or a programmable logic array (PLA) may be customized by utilizing state information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or the block diagrams and combinations of the blocks in the flowcharts and/or the block diagrams may be implemented by the computer-readable program instructions.

The computer-readable program instructions may be provided to a processing unit of a general purpose computer, a special purpose computer, or other programmable data processing apparatuses, thereby producing a machine such that when these instructions are executed by the processing unit of the computer or other programmable data processing apparatuses, an apparatus for implementing functions/actions specified in one or more blocks in the flowcharts and/or the block diagrams is generated. The computer-readable program instructions may also be stored in the computer-readable storage medium. These instructions enable the computer, the programmable data processing apparatuses, and/or other devices to operate in a specific manner, so that the computer-readable medium storing the instructions includes an article of manufacture that includes instructions for implementing various aspects of functions/actions specified in one or more blocks in the flowcharts and/or the block diagrams.

The computer-readable program instructions may also be loaded onto a computer, other programmable data processing apparatuses, or other devices such that a series of operational steps are performed on the computer, other programmable data processing apparatuses, or other devices to produce a computer-implemented process. Thus, the instructions executed on the computer, other programmable data processing apparatuses, or other devices implement the functions/actions specified in one or more blocks in the flowcharts and/or the block diagrams.

The flowcharts and block diagrams in the accompanying drawings illustrate the architectures, functions, and operations of possible implementations of systems, methods, and computer program products according to multiple embodiments of the present disclosure. In this regard, each block in the flowcharts or block diagrams can represent for a part of a module, a program segment, or an instruction, and a part of the module, the program segment or the instruction includes one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above, and the foregoing description is illustrative rather than exhaustive, and is not limited to the disclosed embodiments. Multiple modifications and variations will be apparent to those skilled in the art without departing from the scope and spirit of the illustrated various embodiments.

The selection of terms as used herein is intended to best explain the principles and practical applications of the various embodiments or the technical improvements to technologies on the market, or to enable others of ordinary skill in the art to understand the embodiments disclosed here.

The invention claimed is:

1. A method for providing log information, comprising:
predefining one or more application scenarios, each application scenario including a service operation type and at least one component associated with an application scenario;
determining, by a processor, a first set of semantic segments comprising fault information from multiple semantic segments into which a set of log files of a target system is divided, each semantic segment of the first set of semantic segments including a text unit having a same subject or similar semantics;
extracting, by the processor, key information specific to the target system from the first set of semantic segments;
determining, by the processor, based on the extracted key information, an application scenario of the one or more application scenarios involved in the fault information and at least one log file of the set of log files related to the application scenario, comprising:
   searching the first set of semantic segments for keywords related to a service operation type including a backup operation, a replication operation, or a restore operation;
   determining the service operation type related to the application scenario;
   identifying the application scenario based on the service operation type and the extracted key information;
   determining, based on at least one component associated with the application scenario and a lookup table, at least one log location in which the at least one log file is involved in the application scenario; and
   determining the at least one log file related to the application scenario based on the at least one log location;
generating a fault profile related to the application scenario based on a fault code extracted from the first set of semantic segments;
determining, by the processor, a second set of semantic segments comprising the key information from multiple semantic segments into which the at least one log file is divided; and
providing, by the processor, the fault profile, the first set of semantic segments of the set of log files of the target system and the second set of semantic segments of the at least one log file of the set of log files by highlighting the fault information and the key information in the first set of semantic segments and the second set of semantic segments.

2. The method according to claim 1, further comprising:
acquiring multiple log files from corresponding log locations predefined for multiple components in the target system;
obtaining the set of log files by filtering the multiple log files according to a predefined time period, the set of log files including the set of log files that have been modified recently; and
analyzing the set of log files to mine the key information and intercept key segments from a long log file.

3. The method according to claim 1, further comprising:
dividing, based on a text segmentation algorithm, each log file in the set of log files into at least one semantic segment.

4. The method according to claim 1, wherein determining the first set of semantic segments comprises:
searching the multiple semantic segments into which the set of log files is divided for a fault keyword; and
determining the first set of semantic segments based on a search result such that each semantic segment in the first set of semantic segments comprises the fault keyword.

5. The method according to claim 1, wherein extracting the key information from the first set of semantic segments comprises:
extracting the key information shared among multiple components of the target system from the first set of semantic segments.

6. The method according to claim 1, wherein extracting the key information specific to the target system from the first set of semantic segments comprises:
extracting the key information by searching the first set of semantic segments for at least one keyword indicating a type of the key information.

7. The method according to claim 1, wherein determining the application scenario comprises:
determining, based on the extracted key information, a service operation type related to the application scenario; and
identifying the application scenario based on the service operation type and the key information.

8. The method according to claim 7, wherein determining the at least one log file comprises:
determining at least one component related to the service operation type from multiple components of the target system; and
determining the at least one log file associated with the at least one component from the set of log files.

9. The method according to claim 7, further comprising:
extracting a fault code related to the application scenario from the first set of semantic segments;
generating a fault profile related to the application scenario based on the service operation type, the key information, and the fault code; and
providing the fault profile while providing the first set of semantic segments and the second set of semantic segments.

10. An electronic device, comprising:
a processor; and
a memory coupled to the processor and storing instructions for execution by the processor, wherein the instructions, when executed by the processor, cause the electronic device to perform actions, the actions comprising:
predefining one or more application scenarios, each application scenario including a service operation type and at least one component associated with an application scenario;
determining a first set of semantic segments comprising fault information from multiple semantic segments into which a set of log files of a target system is divided, each semantic segment of the first set of semantic segments including a text unit having a same subject or similar semantics;
extracting key information specific to the target system from the first set of semantic segments;
determining, based on the extracted key information, an application scenario of the one or more application scenarios involved in the fault information and at least one log file of the set of log files related to the application scenario, comprising:
    searching the first set of semantic segments for keywords related to a service operation type including a backup operation, a replication operation, or a restore operation;
    determining the service operation type related to the application scenario;
    identifying the application scenario based on the service operation type and the extracted key information;
    determining, based on at least one component associated with the application scenario and a lookup table, at least one log location in which the at least one log file is involved in the application scenario; and
    determining the at least one log file related to the application scenario based on the at least one log location;
generating a fault profile related to the application scenario based on a fault code extracted from the first set of semantic segments;
determining a second set of semantic segments comprising the key information from multiple semantic segments into which the at least one log file is divided; and
providing the fault profile, the first set of semantic segments of the set of log files of the target system and the second set of semantic segments of the at least one log file of the set of log files by highlighting the fault information and the key information in the first set of semantic segments and the second set of semantic segments.

11. The electronic device according to claim 10, wherein the actions further comprise:
    acquiring multiple log files from corresponding log locations predefined for multiple components in the target system;
    obtaining the set of log files by filtering the multiple log files according to a predefined time period, the set of log files including the set of log files that have been modified recently; and
    analyzing the set of log files to mine the key information and intercept key segments from a long log file.

12. The electronic device according to claim 10, wherein the actions further comprise:
    dividing, based on a text segmentation algorithm, each log file in the set of log files into at least one semantic segment.

13. The electronic device according to claim 10, wherein determining the first set of semantic segments comprises:
    searching the multiple semantic segments into which the set of log files is divided for a fault keyword; and
    determining the first set of semantic segments based on a search result such that each semantic segment in the first set of semantic segments comprises the fault keyword.

14. The electronic device according to claim 10, wherein extracting the key information from the first set of semantic segments comprises:
    extracting the key information shared among multiple components of the target system from the first set of semantic segments.

15. The electronic device according to claim 10, wherein extracting the key information specific to the target system from the first set of semantic segments comprises:
    extracting the key information by searching the first set of semantic segments for at least one keyword indicating a type of the key information.

16. The electronic device according to claim 10, wherein determining the application scenario comprises:
    determining, based on the extracted key information, a service operation type related to the application scenario; and
    identifying the application scenario based on the service operation type and the key information.

17. The electronic device according to claim 16, wherein determining the at least one log file comprises:
    determining at least one component related to the service operation type from multiple components of the target system; and
    determining the at least one log file associated with the at least one component from the set of log files.

18. The electronic device according to claim 16, wherein the actions further comprise:
    extracting a fault code related to the application scenario from the first set of semantic segments;
    generating a fault profile related to the application scenario based on the service operation type, the key information, and the fault code; and
    providing the fault profile while providing the first set of semantic segments and the second set of semantic segments.

19. A computer program product tangibly stored in a computer storage medium and comprising machine-executable instructions that, when executed by a device, cause the device to perform actions, the actions comprising:
    predefining one or more application scenarios, each application scenario including a service operation type and at least one component associated with an application scenario;
    determining a first set of semantic segments comprising fault information from multiple semantic segments into which a set of log files of a target system is divided, each semantic segment of the first set of semantic segments including a text unit having a same subject or similar semantics;
    extracting key information specific to the target system from the first set of semantic segments;
    determining, based on the extracted key information, an application scenario of the one or more application scenarios involved in the fault information and at least one log file of the set of log files related to the application scenario, comprising:
        searching the first set of semantic segments for keywords related to a service operation type including a backup operation, a replication operation, or a restore operation;
        determining the service operation type related to the application scenario;
        identifying the application scenario based on the service operation type and the extracted key information;
        determining, based on at least one component associated with the application scenario and a lookup table, at least one log location in which the at least one log file is involved in the application scenario; and
        determining the at least one log file related to the application scenario based on the at least one log location;
    generating a fault profile related to the application scenario based on a fault code extracted from the first set of semantic segments;

determining a second set of semantic segments comprising the key information from multiple semantic segments into which the at least one log file is divided; and providing the fault profile, the first set of semantic segments of the set of log files of the target system and the second set of semantic segments of the at least one log file of the set of log files by highlighting the fault information and the key information in the first set of semantic segments and the second set of semantic segments.

20. The computer program product according to claim 19, wherein the actions further comprise:

acquiring multiple log files from corresponding log locations predefined for multiple components in the target system;

obtaining the set of log files by filtering the multiple log files according to a predefined time period, the set of log files including the set of log files that have been modified recently; and analyzing the set of log files to mine the key information and intercept key segments from a long log file.

\* \* \* \* \*